(12) United States Patent
Lawyer et al.

(10) Patent No.: US 10,975,870 B2
(45) Date of Patent: *Apr. 13, 2021

(54) BRACKETLESS MAGNETIC PUMP

(71) Applicant: Ecotech, Inc., Allentown, PA (US)

(72) Inventors: Justin Lawyer, Bethlehem, PA (US); Patrick Clasen, Allentown, PA (US); Timothy Marks, Northampton, PA (US)

(73) Assignee: EcoTech, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,393

(22) Filed: May 26, 2020

(65) Prior Publication Data

US 2020/0355186 A1 Nov. 12, 2020

Related U.S. Application Data

(63) Continuation of application No. 16/103,396, filed on Aug. 14, 2018, now Pat. No. 10,662,951, which is a
(Continued)

(51) Int. Cl.
*F04D 13/02* (2006.01)
*F04D 29/62* (2006.01)
(Continued)

(52) U.S. Cl.
CPC .......... *F04D 13/027* (2013.01); *A01K 63/047* (2013.01); *F04D 13/024* (2013.01);
(Continued)

(58) Field of Classification Search
CPC ...... F04D 13/024; F04D 13/027; F04D 13/06; F04D 13/08; F04D 29/605; F04D 29/628; F04D 29/406; F04D 25/026; A01K 63/047
(Continued)

(56) References Cited

U.S. PATENT DOCUMENTS 2,506,886 A * 5/1950 Zozulin ............... H02K 49/108
416/3
3,481,586 A * 12/1969 Roberts ............... A01K 63/047
366/264
(Continued)

*Primary Examiner* — Christopher S Bobish
(74) *Attorney, Agent, or Firm* — Berenato & White, LLC

(57) ABSTRACT

A fluid pump assembly is used in combination with a container having a wall. The pump assembly comprises a first casing disposed outside the container in contact with the wall, a first magnetic assembly mounted to the first casing and operatively associated with a drive motor, a second casing disposed inside the container in contact with the wall, and a second magnetic assembly mounted to the second casing and operatively associated with an propeller. The first magnetic assembly includes a rotatable magnetic drive member drivingly coupled to the drive motor. The magnetic drive member is magnetically coupled to the magnetic driven member through the wall for imparting a rotary driving force of the drive motor to the propeller. Furthermore, the second casing is detachably connected to the second side of the wall of the container solely by magnetic attraction force between the first and second magnetic assemblies.

17 Claims, 7 Drawing Sheets

Related U.S. Application Data continuation of application No. 15/397,068, filed on Jan. 3, 2017, now Pat. No. 10,047,750, which is a continuation of application No. 14/861,594, filed on Sep. 22, 2015, now Pat. No. 9,534,602, which is a continuation of application No. 14/288,088, filed on May 27, 2014, now Pat. No. 9,140,264, which is a continuation of application No. 13/494,424, filed on Jun. 12, 2012, now Pat. No. 8,734,134, which is a continuation of application No. 12/871,191, filed on Aug. 30, 2010, now Pat. No. 8,197,232, which is a continuation of application No. 12/164,193, filed on Jun. 30, 2008, now Pat. No. 7,785,081, which is a continuation of application No. 11/376,316, filed on Mar. 16, 2006, now Pat. No. 7,393,188.

(60) Provisional application No. 60/662,771, filed on Mar. 16, 2005.

(51) Int. Cl.

| | | |
|---|---|---|
| *F04D 13/08* | (2006.01) | |
| *F04D 29/40* | (2006.01) | |
| *F04D 25/02* | (2006.01) | |
| *A01K 63/04* | (2006.01) | |
| *F04D 29/60* | (2006.01) | |
| *F04D 13/06* | (2006.01) | |

(52) U.S. Cl.
CPC ............ *F04D 13/08* (2013.01); *F04D 25/026* (2013.01); *F04D 29/406* (2013.01); *F04D 29/605* (2013.01); *F04D 29/628* (2013.01); *F04D 13/06* (2013.01)

(58) Field of Classification Search
USPC ........................................................ 417/420
See application file for complete search history.

(56) References Cited

U.S. PATENT DOCUMENTS

| | | | | | |
|---|---|---|---|---|---|
| 3,710,156 | A * | 1/1973 | Laing | ................... | H02K 5/1282 |
| | | | | | 310/54 |
| 4,285,813 | A * | 8/1981 | Stewart | ................ | A01K 63/047 |
| | | | | | 210/167.25 |
| 4,304,532 | A * | 12/1981 | McCoy | .................... | F16J 15/50 |
| | | | | | 310/104 |
| 4,512,724 | A * | 4/1985 | Horvath | ............... | A01K 63/047 |
| | | | | | 210/167.21 |
| 4,982,461 | A * | 1/1991 | Mikiya | .............. | A61H 33/6063 |
| | | | | | 4/541.3 |
| 5,127,796 | A * | 7/1992 | Nakao | .................. | H02K 49/108 |
| | | | | | 417/420 |
| 5,131,821 | A * | 7/1992 | Marioni | ............... | A01K 63/047 |
| | | | | | 210/167.23 |
| 5,215,501 | A * | 6/1993 | Ushikoshi | ........... | F04C 29/0064 |
| | | | | | 415/10 |
| 6,302,661 | B1 * | 10/2001 | Khanwilkar | ........ | F04D 13/0646 |
| | | | | | 415/900 |
| 6,551,078 | B2 * | 4/2003 | Huang | .................. | F04B 17/042 |
| | | | | | 210/167.26 |
| 7,249,571 | B2 * | 7/2007 | Allis | ..................... | A01K 63/042 |
| | | | | | 119/261 |
| 7,393,188 | B2 * | 7/2008 | Lawyer | ................ | F04D 29/628 |
| | | | | | 417/420 |
| 2001/0016170 | A1 * | 8/2001 | Ozaki | ................ | F04D 13/0666 |
| | | | | | 417/420 |
| 2004/0018104 | A1 * | 1/2004 | Watkins | ............... | A01K 63/047 |
| | | | | | 417/423.3 |
| 2004/0216253 | A1 * | 11/2004 | Enoch, III | ................ | A47L 1/09 |
| | | | | | 15/103 |
| 2004/0218468 | A1 * | 11/2004 | Terentiev | ............. | F04D 13/027 |
| | | | | | 366/273 |
| 2005/0120473 | A1 * | 6/2005 | Southon | ............ | A61H 33/6047 |
| | | | | | 4/541.6 |
| 2006/0013714 | A1 * | 1/2006 | Wu | .......................... | F04D 1/02 |
| | | | | | 417/430 |

* cited by examiner

BRACKETLESS MAGNETIC PUMP

CROSS-REFERENCE TO RELATED APPLICATIONS AND CLAIM TO PRIORITY

This application is a continuation of application Ser. No. 16/103,396, filed Aug. 14, 2018, now U.S. Pat. No. 10,662,951, which is a continuation of application Ser. No. 15/397,068, filed Jan. 3, 2017, now U.S. Pat. No. 10,047,750, which is a continuation of application Ser. No. 14/861,594, filed Sep. 22, 2015, now U.S. Pat. No. 9,534,602, which is a continuation of application Ser. No. 14/288,088, filed May 27, 2014, now U.S. Pat. No. 9,140,264, which is a continuation of application Ser. No. 13/494,424, filed Jun. 12, 2013, now U.S. Pat. No. 8,734,134, which is a continuation of application Ser. No. 12/871,191, filed on Aug. 30, 2010, now U.S. Pat. No. 8,197,232, which is a continuation of application Ser. No. 12/164,193, filed Jun. 30, 2008, now U.S. Pat. No. 7,785,081, which is a continuation of application Ser. No. 11/376,316 filed Mar. 16, 2006, now U.S. Pat. No. 7,393,188, which claims the benefit of priority of provisional patent application No. 60/662,771, filed Mar. 16, 2005, the disclosures of which are incorporated by reference and to which priority is claimed.

FIELD OF THE INVENTION

The present invention relates to fluid pump assemblies in general, and more particularly to a fluid pump that is magnetically supported in position and in which a driving force is transmitted to an propeller through the medium of magnetic force.

BACKGROUND OF THE INVENTION

In order to properly care for fish and other aquatic organisms contained within a reef aquarium, adequate circulation is required. The role of circulation is two fold: first, circulation acts to constantly mix the aquarium water itself, ensuring that proper chemistry is maintained throughout the entire aquarium. Adequate circulation maintains the equilibrium of oxygen and carbon dioxide by increasing the rate at which water flows from the bottom of the tank to the top, where it can take in these compounds from the air. The second role of circulation is related to the nature of the inhabitants of a reef aquarium. Because many reef inhabitants are sessile (they do not move), circulation is the only means by which nutrients such as food and oxygen are brought to these animals and the only means by which waste is expelled. In the ocean, corals and other sessile animals have the benefit of large waves crashing into the reef in a random but consistent fashion. Within the constraints of a glass box or aquarium, a pump is used as a substitute.

Prior aquarium circulating devices and pumps feature two aspects that make them less ideal than the present invention. First, designs featuring epoxy sealed motors within the aquarium have the unfortunate side effect of being relatively large and distracting to the intrinsic beauty of an aquarium, add unwanted heat to the aquarium through direct contact with the motor stator, and require that electricity be brought into the aquarium itself via a power chord or a battery sealed into the motor assembly. Second, some prior designs utilize a mechanical bracket which hangs over the top of the aquarium in order to support the pump within the aquarium. In some prior pumps in which the motor and the centrifugal propeller are magnetically coupled through the glass, brackets are used to support and align the rotating component within the aquarium. The prior designs are unsatisfactory because they are bulky due to the motor being placed within the aquarium or due to the brackets supporting the motor outside the aquarium. Furthermore, the prior designs required that the pump be located at a location determined by the location of the bracket or be on the bottom of the aquarium due to the weight of the pump.

The present invention attempts to remedy these drawbacks and provides a fluid pump assembly adapted to be mounted to an aquarium without the use of mechanical aids, such as brackets. The disclosed pump can be located anywhere on the surfaces of the aquarium, thus maximizing the aesthetic effects of the aquarium and facilitating water circulation by allowing the pump to located at a location achieved optimized fluid flow based upon the interior characteristics of the aquarium.

SUMMARY OF THE INVENTION

The present invention provides a fluid pump assembly for use in a fluid container.

According to a first aspect of the present invention, there is provided a fluid pump kit comprising a first magnetic assembly operatively associated with a drive motor, a second magnetic assembly operatively associated with an propeller, a first casing supporting the first magnetic assembly, a second casing supporting the second magnetic assembly, and a non-magnetic spacer separating the first and second magnetic assemblies. The drive motor and the propeller are magnetically coupled to each other by the first and second magnetic assemblies through the spacer for drivingly coupling the drive motor to the propeller. Moreover, the first and second casings are detachably held together solely by clamping the spacer from opposite sides thereof by a magnetic attraction force between the first and second magnetic assemblies.

According to a second aspect of the present invention, there is provided a fluid pump assembling used in combination with a container having a wall for holding an amount of fluid. The pump assembly comprises a first casing disposed outside the container in contact with a first side of the wall of the container, a first magnetic assembly mounted to the first casing and operatively associated with a drive motor, a second casing disposed inside the container in contact with a second side of the wall of the container, and a second magnetic assembly mounted to the second casing and operatively associated with an propeller. The first magnetic assembly includes a rotatable magnetic drive member drivingly coupled to the drive motor and spaced from the wall outside the container, while the magnetic drive member is magnetically coupled to the magnetic driven member through the wall for imparting a rotary driving force to the propeller in response to operation of the drive motor. Furthermore, each of the first and second casings is detachably connected to the associated side of the wall of the container solely by magnetic attraction force between the first and second magnetic assemblies.

The invention furthermore includes a method of circulating water within an aquarium. A first casing having a first rotatable magnetic member coupled to a source of rotary motion is provided. A second casing having a propeller coupled to a second rotatable magnetic member is provided. A container having a fluid therein is provided. The first casing is positioned on an exterior wall of the container and the second casing is positioned on an interior wall of the container within the fluid in coaxial alignment with the first casing. The casings remain in alignment as a result of magnetic attraction between the rotatable magnetic member The source of rotary motion is operated and thereby causes the first rotatable magnetic member to rotate for thereby causing cooperating rotation of the second rotatable magnetic member and of the propeller.

BRIEF DESCRIPTION OF THE DRAWINGS

Objects and advantages of the invention will become apparent from a study of the following specification when viewed in light of the accompanying drawings, wherein.

DESCRIPTION OF PREFERRED EMBODIMENT(S)

Figure 1:
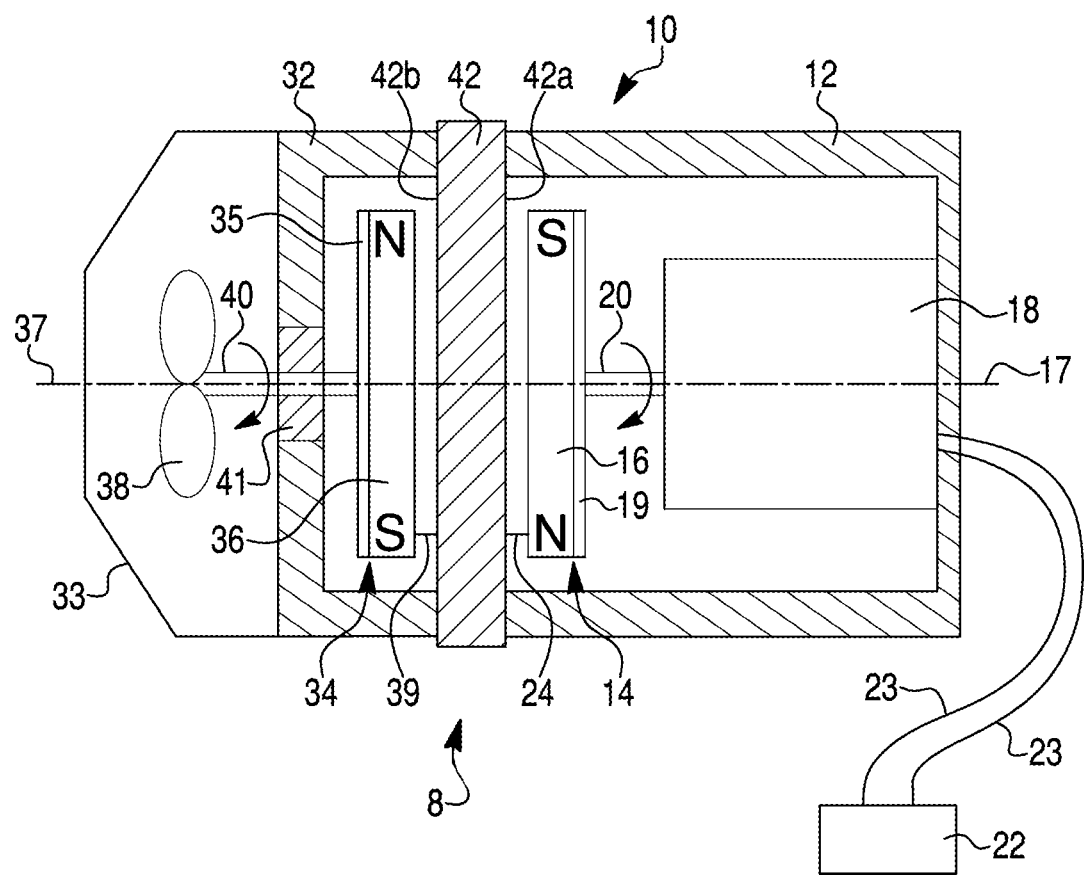
FIG. 1 is a sectional view of a fluid pump kit including a fluid pump assembly according to a first exemplary embodiment of the present invention.

The preferred embodiments of the present invention will now be described with the reference to accompanying drawings.

For purposes of the following description, certain terminology is used in the following description for convenience only and is not limiting. The words such as "inside", "outside", "top", "bottom" and "side" designate directions in the drawings to which reference is made. The words "smaller" and "larger" refer to relative size of elements of the apparatus of the present invention and designated portions thereof. The terminology includes the words specifically mentioned above, derivatives thereof and words of similar import. Additionally, the word "a", as used in the claims, means "at least one".

FIG. 1 depicts a fluid pump kit 8 comprising a fluid pump assembly according to a first exemplary embodiment of the present invention, generally depicted with the reference numeral 10, in the form of a kit. The fluid pump assembly 10 comprises a first casing 12 housing a first magnetic assembly 14 operatively associated with a drive motor 18, and a second casing 32 housing a second magnetic assembly 34 operatively associated with an propeller 38. The fluid pump kit 8 further comprises a non-magnetic spacer 42 separating the first and second magnetic assemblies 14 and 34, respectively. The non-magnetic spacer 42 has a first side 42a and a second side 42b oriented opposite and substantially parallel to each other. The first side 42a of the spacer 42 is in contact with the first casing 12, while the second side 42b is in contact with the second casing 32. A material such as ABS, Teflon or ultra high molecular weight polyethylene (UHMW) is suitable for both first and second casings. The spacer 42 may be rubber or other non-magnetic polymer and has a thickness of approximately 0.5 inches.

More specifically, the first magnetic assembly 14 includes a magnetic drive member 16 mounted within the first casing 12 for rotation about an axis 17 and drivingly coupled to the electric drive motor 18 by a drive shaft 20. In other words, the drive shaft 20 is coaxial to the axis 17. The magnetic drive member 16 has at least one pair of magnetic poles (N) and (S). Preferably, the magnetic drive member 16 is in the form of circular disk and has a plurality of pairs of magnetic poles (N) and (S). In such an arrangement of the magnetic drive member 16, the magnetic poles (N) and (S) are oriented in a two-dimensional array, such as radially along the disc 16. Further preferably, the magnetic drive member 16 is made from neodymium or any other high performance magnetic material offering low physical volume and high magnetic flux.

It will be appreciated that the drive motor 18 may be of any appropriate type, such as hydraulic, electric, etc. Preferably, the drive motor 18 is an electric motor (either AC motor or DC motor). For this reason, a suitable cover 19 made of magnetically permeable material, such as steel, is attached to and covers a side of the magnetic drive member 16 facing the drive motor 18 (motor side) to shield the electric motor 18 from magnetic flux, as this would otherwise cause the electric motor 18 to be less effective at producing torque, by diminishing the magnetic field within the electric motor 18 itself. The electric motor 18, as illustrated in FIG. 1, is attached to a power source 22 separate from the first casing 12 through electric wires 23. The electric motor 18 may also be powered by a battery (not shown) attached to the electric wires 23.

Preferably, the electric motor 18 has a bearing (not shown) suitably sufficient to tolerate axial load applied to the drive shaft 20. Alternatively, axial load on the drive shaft 20 may be accommodated by a separate bearing assembly (not shown) attached to the first casing 12 and interposed around the drive shaft 20 between the electric motor 18 and the magnetic drive member 16. The first casing 12 is situated against the first side 42a of the non-magnetic spacer 42, and the magnetic drive member 16 is mounted in the first casing 12 so that the axis 17 of rotation of the drive shaft 20 of the electric motor 18 is substantially perpendicular to the first side 42a of the spacer 42. As further illustrated in FIG. 1, the magnetic drive member 16 is disposed adjacent to the spacer 42 and is axially spaced from the first side 42a thereof with a small gap 24.

The second magnetic assembly 34 includes a driven member 36 formed from a magnetic material, such as neodymium, mounted within the second casing 32 for rotation about an axis 37 and drivingly coupled to the propeller 38 by a driven shaft 40. In other words, the driven shaft 40 is coaxial to the axis 37. The magnetic driven member 36 has at least one pair of magnetic poles (N) and (S). Preferably, the magnetic driven member 36 is in the form of circular disk and has a plurality of pairs of magnetic poles (N) and (S). In other words, in the preferred embodiment of the present invention, the magnetic drive member 16 is substantially identical to the magnetic driven member 36. A steel shield 35 is disposed on and covers the distal surface of drive member 36. The shield 35 short circuits the magnetic flux of driven member 36 and thereby increases the efficiency of pump assembly 10. Moreover, the second casing 32 is situated against the second side 42b of the non-magnetic spacer 42, and the magnetic driven member 36 is mounted in the first casing 12 so that the axis 17 of rotation of the driven shaft 40 is substantially perpendicular to the second side 42b of the spacer 42. In a properly assembled condition, the axis 17 of the magnetic drive member 16 and the axis 37 of magnetic driven member 36 are substantially coaxial. In other words, the electric motor 18 and the propeller 38 are magnetically coupled to each other by the magnetic drive member 16 and the magnetic driven member 36 through the spacer 42 so as to drivingly couple the drive motor 18 to the propeller 38.

As further illustrated in FIG. 1, the magnetic driven member 36 is disposed adjacent to the spacer 42 and is axially spaced from the second side 42b thereof with a small gap 39. The mounting of the magnetic driven member 36 and the propeller 38 in the second casing 32 includes a bearing 41 of suitable material properties to support the driven shaft 40, transmit to the second casing 32 the clamping forces caused by the first and second magnetic assemblies 14 and 34, and minimize the friction of rotation. When used for salt water applications, the bearing 41 should be a plastic composition, Teflon or UHMW with a suitably hard and smooth mating surface, such as made from metal or ceramic material. A protective screen 33 is attached to the second casing 32 around the propeller 38 to allow water to circulate in response to rotation of propeller 38.

The first casing 12 housing the first magnetic assembly 14, and the second casing 32 housing the second magnetic assembly 34 are detachably held together by magnetic attraction between the first and second magnetic assemblies 14 and 34, respectively. The magnetic attraction is very high. The spacer 42, which may be made from rubber or some non-magnetic polymer, has sufficient thickness to reduce the attractive force between the magnetic assemblies 14, 34 sufficient to allow the casings 12,32 to be separated prior to installation. More specifically, the magnetic drive member 16 and the magnetic driven member 36 generate sufficient magnetic attraction therebetween to clamp the first casing 12 and the second casing 32 against the spacer 42 with sufficient force to support both casings against gravity without the use of mechanical aids.

When installed and the drive motor 18 is activated, the magnetic drive member 16 drivingly coupled thereto through rotor 20 is rotated, thereby causing the magnetic driven member 36 to rotate due to the attractive magnetic forces between opposing poles on the magnetic driven member 36 and the magnetic drive member 16. As the magnetic driven member 36 is drivingly connected to the propeller 38, the rotation of the drive motor 18 causes corresponding rotation of the propeller 38 due to the magnetic coupling between the magnetic drive member 16 and the magnetic driven member 36.

Figure 2:
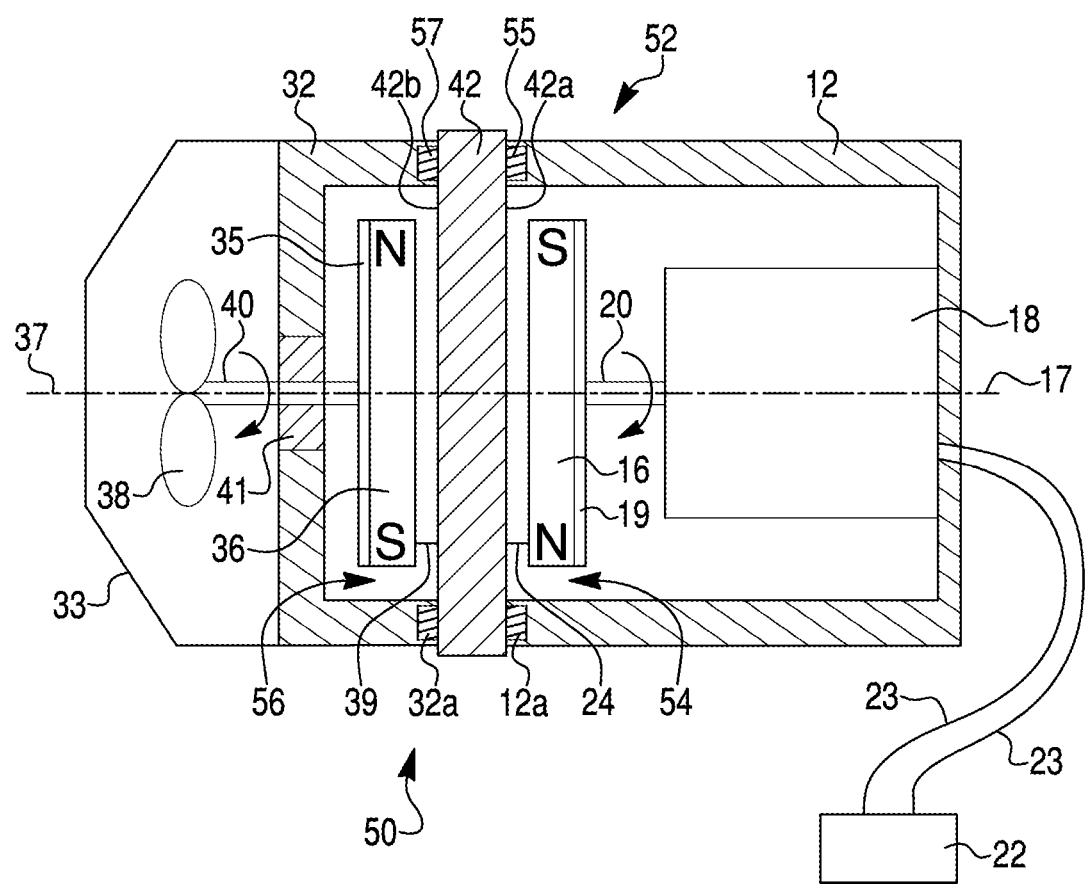
FIG. 2 is a sectional view of a fluid pump kit including a fluid pump assembly according to a second exemplary embodiment of the present invention.

FIG. 2 of the drawings illustrates a second exemplary embodiment of a fluid pump kit, generally depicted with the reference numeral 50. Components, which are unchanged from, or function in the same way as in the first exemplary embodiment depicted in FIG. 1 are labeled with the same reference numerals, sometimes without describing detail since similarities between the corresponding parts in the two embodiments will be readily perceived by the reader. The fluid pump kit 50 corresponds substantially to the fluid pump kit 8 of FIG. 1 with the exception of the first and second magnetic assemblies that will therefore be explained in detail below.

The fluid pump kit 50 in accordance with the second exemplary embodiment of the present invention comprises a fluid pump assembly 52 including a first casing 12 housing a first magnetic assembly 54 operatively associated with drive motor 18, and a second casing 32 housing a second magnetic assembly 56 operatively associated with an propeller 38. The fluid pump kit 50 further comprises a non-magnetic spacer 42 separating the first and second magnetic assemblies 54 and 56, respectively.

The first magnetic assembly 54 includes a rotatable magnetic drive member 16 and at least one annularly oriented first clamping magnet 55. The magnetic drive member 16 is mounted within the first casing 12 for rotation about axis 17 and is drivingly coupled to the drive motor 18 by a drive shaft 20. The first clamping magnet 55 is secured to the periphery of first casing 12 and preferably has a planar outer surface coplanar with the associated end surface of casing 12. Preferably, the first clamping magnet 55 includes a plurality of first peripherally spaced clamping magnets 55 embedded into an inner face 12a of the first casing 12 facing the first side 42a of the spacer 42. Alternately the first clamping magnets may be adhesively secured within a series of corresponding slots formed in casing 12.

Similarly, the second magnetic assembly 56 includes a rotatable magnetic driven member 36 and at least one second clamping magnet 57. The magnetic driven member 36 is mounted within the second casing 32 for rotation about an axis 37 and is drivingly coupled to the propeller 38 by a driven shaft 40. The at least one second clamping magnet 57 is secured to the periphery of second casing 32. Preferably, the second clamping magnet 57 includes a plurality of peripherally spaced second clamping magnets 57 embedded into an inner face 32a of the second casing 32 facing the second side 42b of the spacer 42 in order to have an outer surface coplanar with the associated inner face 32a.

According to the second embodiment of the present invention, the first casing 12 housing the first magnetic assembly 54, and the second casing 32 housing the second magnetic assembly 56 are detachably held together solely by clamping the spacer 42 from opposite sides thereof by magnetic attraction between the first and second clamping magnets 55 and 57, respectively. More specifically, the first and second clamping magnets 55 and 57 provide the magnetic attraction force therebetween strong enough to clamp the first casing 12 and the second casing 32 against the spacer 42 with sufficient force to support both casings against gravity without the use of mechanical aids. When the pump kit 50 is installed and the drive motor 18 is activated, the magnetic drive member 16 drivingly coupled thereto is rotated, thereby causing the magnetic driven member 36 to rotate due to the attractive magnetic forces between opposing poles on the magnetic driven member 36 and the magnetic drive member 16 passing through the spacer 42, as shown in FIG. 1. Accordingly, the first and second clamping magnets 55 and 57 are magnetically stronger and physically larger than the magnets of the drive member 16 and the driven member 36. The mass of the rotating drive member 16 and the driven member 36 are less, requiring a smaller motor to operate the pump assembly. Additionally, in that event, the drive train experiences less torque, particularly at start-up, places less load upon the bearings, and thus achieves a more efficient use of power.

Alternatively, one of the clamping magnets 55 and 57 may be a metal member made of a ferromagnetic material.

Figure 3:
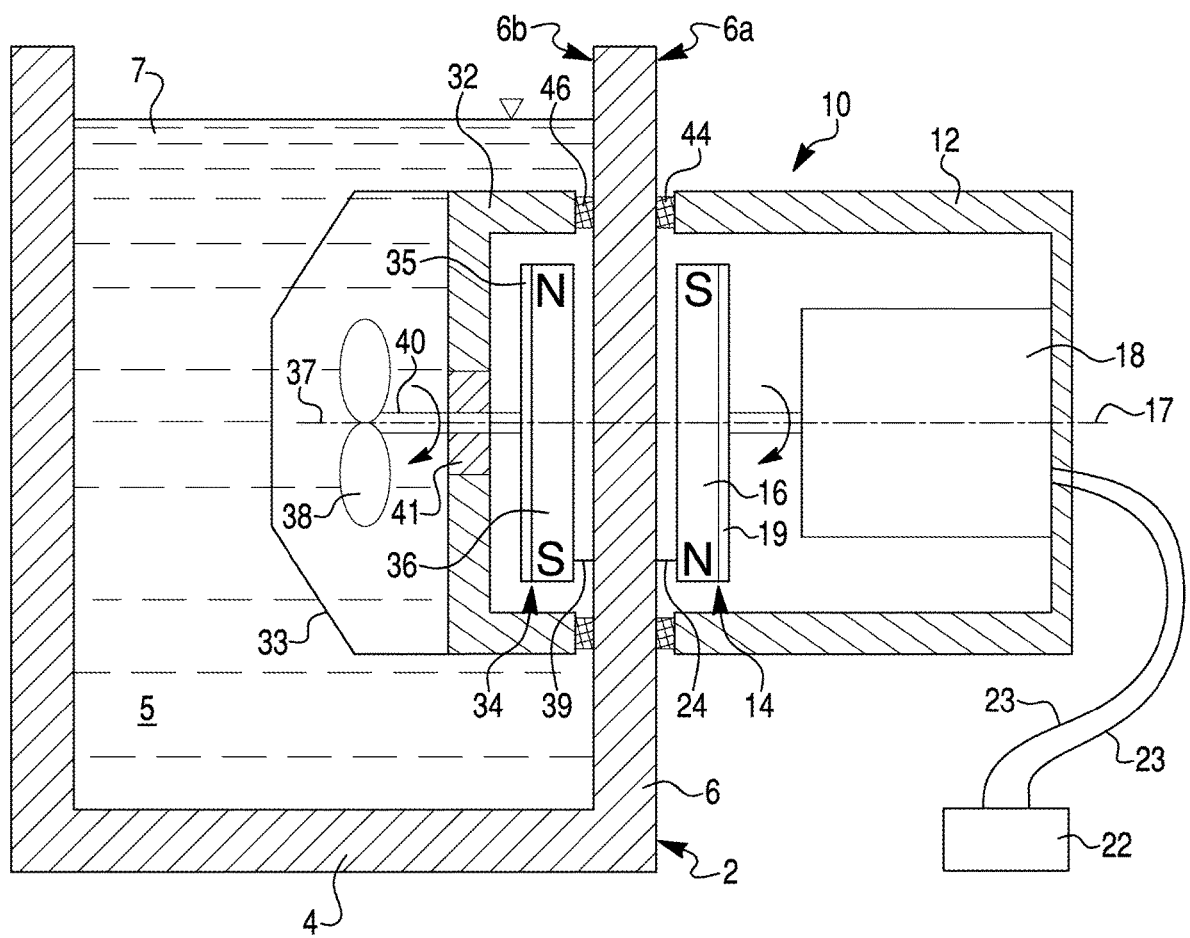
FIG. 3 is a sectional view of the fluid pump assembly according to the first exemplary embodiment of the present invention in combination with a fluid container.

FIG. 3 depicts the fluid pump assembly 10 in accordance with the first exemplary embodiment of the present invention, used in combination with a container 2 provided for holding an amount of fluid 7, such as liquid. It will be appreciated that the container 2 may be of any appropriate form, such as an aquarium. The container 2 comprises a bottom wall 4 and a side wall 6 extending substantially vertically upwardly from the bottom wall 4. The bottom wall 4 and the side wall 6 of the container 2 define a compartment 5 holding the liquid 7. The side wall 6 of the container 2 has a first side 6a and a second side 6b oriented opposite and substantially parallel to each other.

The fluid pump assembly 10 comprises a first casing 12 disposed outside the container 2 and housing a first magnetic assembly 14 operatively associated with a drive motor 18, and a second casing 32 disposed inside the container 2 submersed within the liquid 7 and housing a second magnetic assembly 34 operatively associated with an propeller 38. A material such as ABS, Teflon or ultra high molecular weight polyethylene (UHMW) may be used for both first and second casings. A protective shroud 33 is attached to the second casing 32 around the propeller 38 to prevent aquarium inhabitants from contacting the spinning propeller 38 and for permitting water to circulate in response to rotation of propeller 38.

Each of the first and second magnetic assemblies 14 includes a magnetic member (16 or 36) having at least one pair of magnetic poles (N) and (S). Preferably, the magnetic drive member 16 is in the form of circular disk and has a plurality of pairs of magnetic poles (N) and (S). In such an arrangement of the magnetic drive member 16, the magnetic poles (N) and (S) are oriented in a two-dimensional array, such as radially along the disc 16. Further preferably, the magnetic drive member 16 is made from neodymium or any other high performance magnetic material offering low physical volume and high magnetic flux.

Alternatively, the magnetic members may be electro-magnets (not shown). In the case of electro-magnets, there would be no moving parts on the outside of the container 2, and a sensing device, such as Hall effect sensors, could be used to determine the direction of movement of the magnetic material on the inside of the container 2. A microprocessor could be used to alternate current in such a way that speed of the propeller 38 is controllable.

Figure 4:
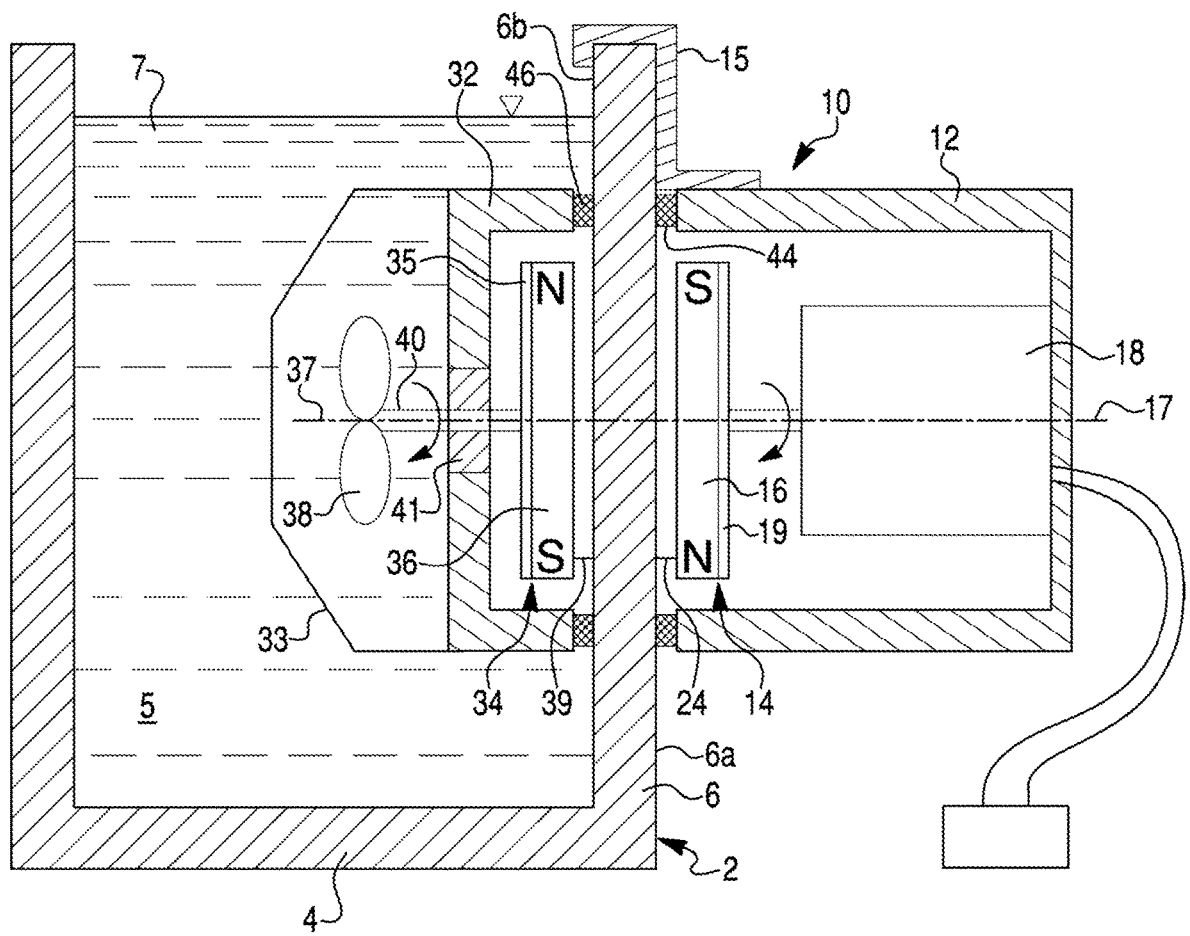
FIG. 4 is a sectional view of the alternative embodiment of the combination of the fluid pump assembly according to the first exemplary embodiment of the present invention and the fluid container.

Preferably, the first casing 12 and the second casing 32 are detachably held together solely by clamping the side wall 6 of the container 2 from opposite sides thereof by a magnetic attraction force between the magnetic drive member 16 and the magnetic driven member 36. Alternatively, as illustrated in FIG. 4, a support structure, such as a bracket member 15, may be used to support the heavier first casing 12 in the event that the drive motor 18 is too heavy, such as if an AC induction motor were instead of a brushless DC motor. In any case, the second casing 32 is detachably connected to the first side 6b of the side wall 6 of the container 2 solely by the magnetic attraction between the magnetic drive member 16 and the magnetic driven member 36. The rotation of the drive motor 18 causes corresponding rotation of the propeller 38 due to the magnetic coupling between the magnetic drive member 16 and the magnetic driven member 36.

Moreover, the first casing 12 and the second casing 32 automatically come into coaxial alignment by virtue of the magnetic attraction provided by the magnetic assemblies 14 and 34 communicating magnetically with each other. The first casing 12 and the second casing 32 are prevented from rotating and held against gravity by means of at least one first friction member 44 attached to an inner face 12a of the first casing 12 facing the first side 6a of the side wall 6 of the container 2, and at least one second friction member 46 attached to an outer face 12b of the second casing 32 facing the second side 6b of the side wall 6 of the container 2. The friction members 44 and 46 are made from material with a relatively high friction coefficient and preferably are formed from a resilient material.

Figure 5:
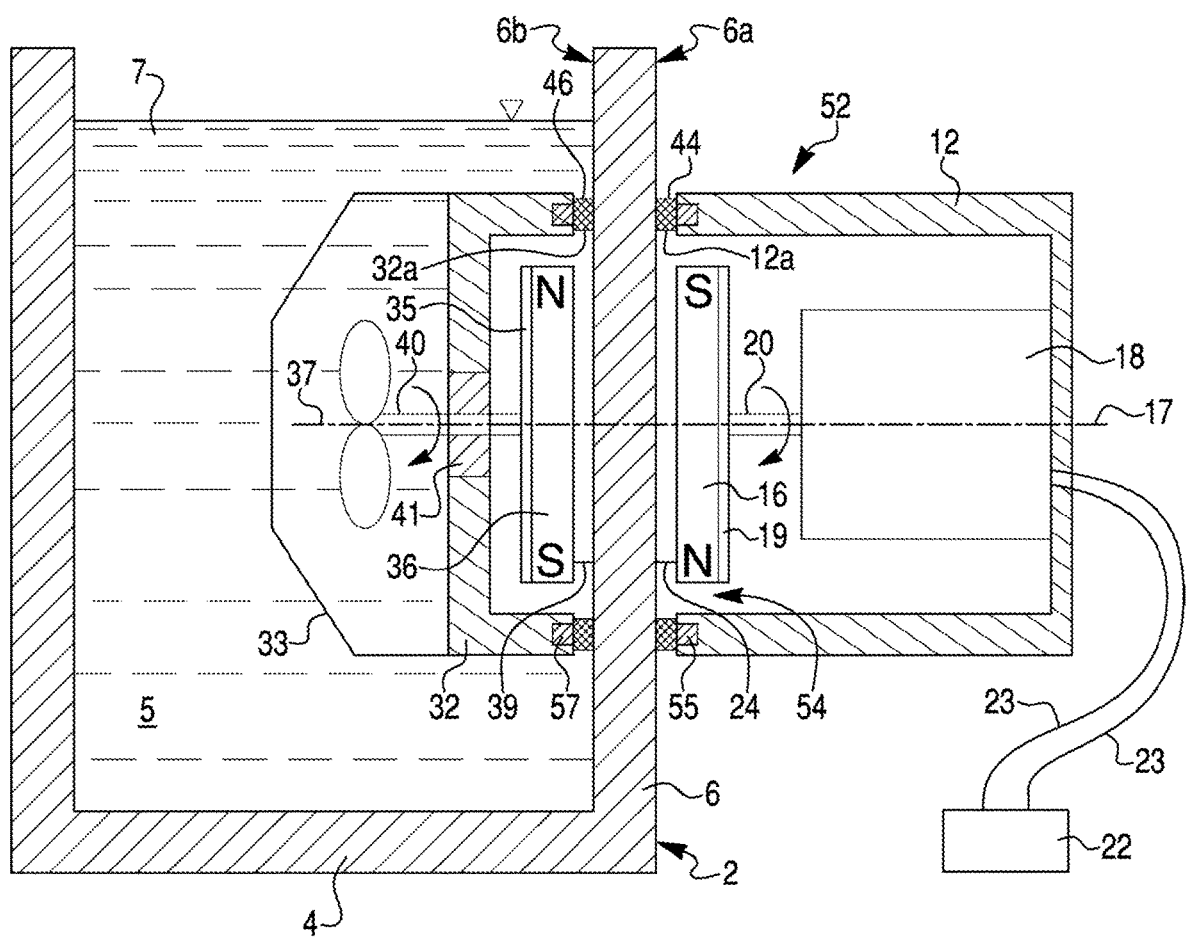
FIG. 5 is a sectional view of the fluid pump assembly according to the second exemplary embodiment of the present invention in combination with the fluid container.

FIG. 5 depicts the fluid pump assembly 10 in accordance with the second exemplary embodiment of the present invention, used in combination with the container 2. The fluid pump assembly 52 comprises a first casing 12 disposed outside the container 2 and housing a first magnetic assembly 54 operatively associated with a drive motor 18, and a second casing 32 disposed inside the container 2 submersed within the liquid 7 and housing a second magnetic assembly 56 operatively associated with an propeller 38.

The first magnetic assembly 54 includes a rotatable magnetic drive member 16 and at least one first clamping magnet 55. The magnetic drive member 16 is mounted within the first casing 12 for rotation about an axis 17 and drivingly coupled to the drive motor 18 by a drive shaft 20. The at least one first clamping magnet 55 is secured to the first casing 12. Preferably, the at least one first clamping magnet 55 includes a plurality of first clamping magnets 55 at least partially imbedded into an inner face 12a of the first casing 12 facing the first side 6a of the side wall 6 of the container 2. Similarly, the second magnetic assembly 56 includes a rotatable magnetic driven member 36 and at least one second clamping magnet 57. The magnetic driven member 36 is mounted within the second casing 32 for rotation about an axis 37 and drivingly coupled to the propeller 38 by a driven shaft 40. The at least one second clamping magnet 57 is secured to the second casing 32. Preferably, the at least one second clamping magnet 57 includes a plurality of second clamping magnets 57 at least partially imbedded into an inner face 32a of the second casing 32 facing the second side 6b of the side wall 6. Alternatively, one of the clamping magnets 55 and 57 may be a metal member made of a ferromagnetic material.

Figure 6:
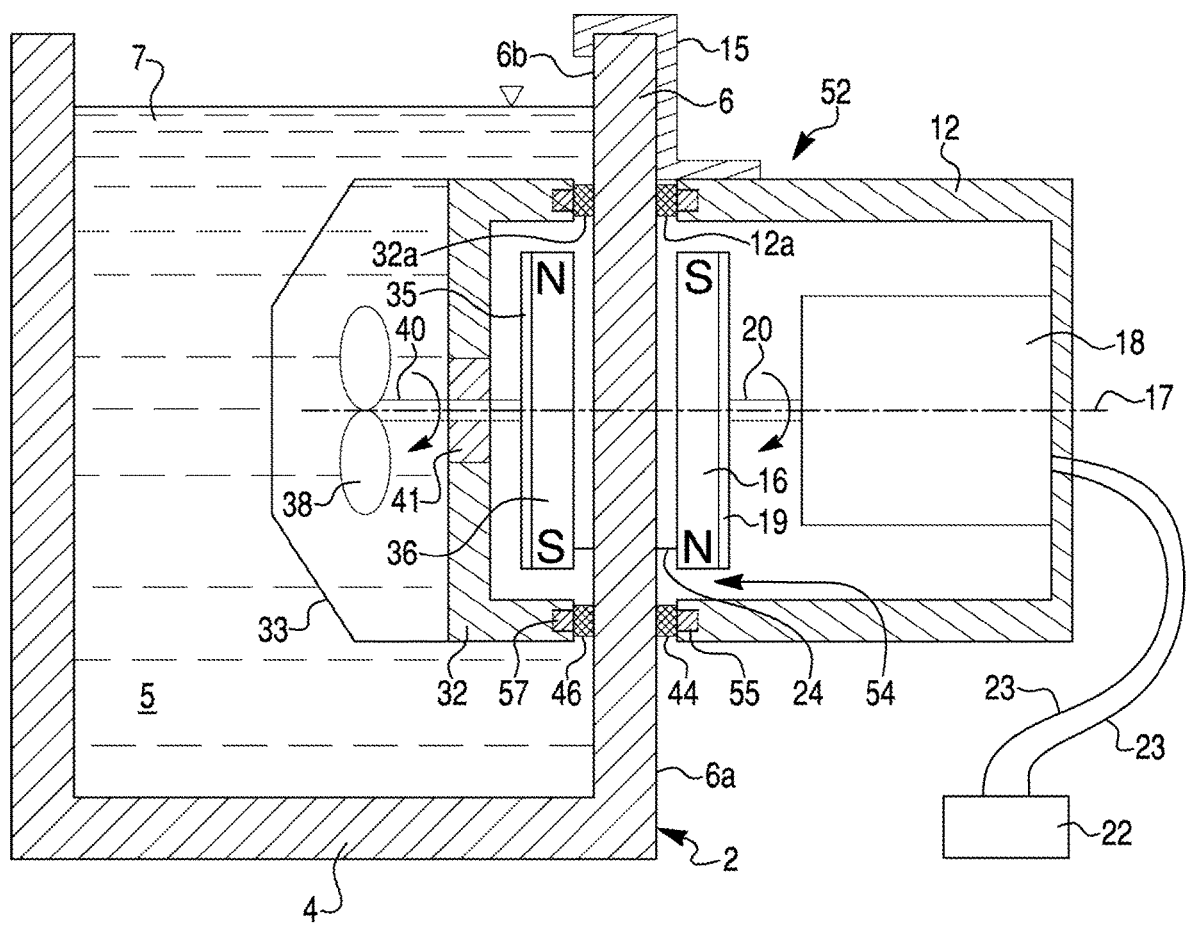
FIG. 6 is a sectional view of the alternative embodiment of the combination of the fluid pump assembly according to the second exemplary embodiment of the present invention and the fluid container.

The first casing 12 housing the first magnetic assembly 54, and the second casing 32 housing the second magnetic assembly 56 are detachably held together solely by clamping the side wall 6 of the container 2 from opposite sides thereof by magnetic attraction between the first and second clamping magnets 55 and 57, respectively. More specifically, the first and second clamping magnets 55 and 57 provide sufficient magnetic attraction therebetween to clamp the first casing 12 and the second casing 32 against the side wall 6 of the container 2 with sufficient force to support both casings 12 and 32 against gravity without the use of mechanical aids. Alternatively, as illustrated in FIG. 6, a support structure, such as a bracket member 15, may be used to support the heavier first casing 12 in the event that the drive motor 18 is too heavy, such as if an AC induction motor were used instead of a brushless DC motor. In any case, the second casing 32 is detachably connected to the first side 6b of the side wall 6 of the container 2 solely by the magnetic attraction force between the magnetic drive member 16 and the magnetic driven member 36.

The rotation of the drive motor 18 causes corresponding rotation of the propeller 38 due to the magnetic coupling between the magnetic drive member 16 and the magnetic driven member 36. Accordingly, the first and second clamping magnets 55 and 57 are magnetically stronger and physically larger than the magnets of the drive member 16 and the driven member 36. However, the mass of the rotating drive member 16 and the driven member 36 are less, requiring a smaller motor to operate the pump assembly and places less load upon the bearings and thus achieves a more efficient use of power.

Moreover, the first casing 12 and the second casing 32 automatically come into alignment, also by means of the magnetic forces provided by the magnetic assemblies 14 and 34 communicating magnetically with each other. The first casing 12 and the second casing 32 are prevented from rotating and against gravity by means of at least one first friction member 44 attached to an inner face 12a of the first casing 12 facing the first side 6a of the side wall 6 of the container 2, and at least one second friction member 46 attached to an outer face 12b of the second casing 32 facing the second side 6b of the side wall 6 of the container 2. The friction members 44 and 46 are made from material with a relatively high friction coefficient and preferably are made of a resilient material.

Figure 7:
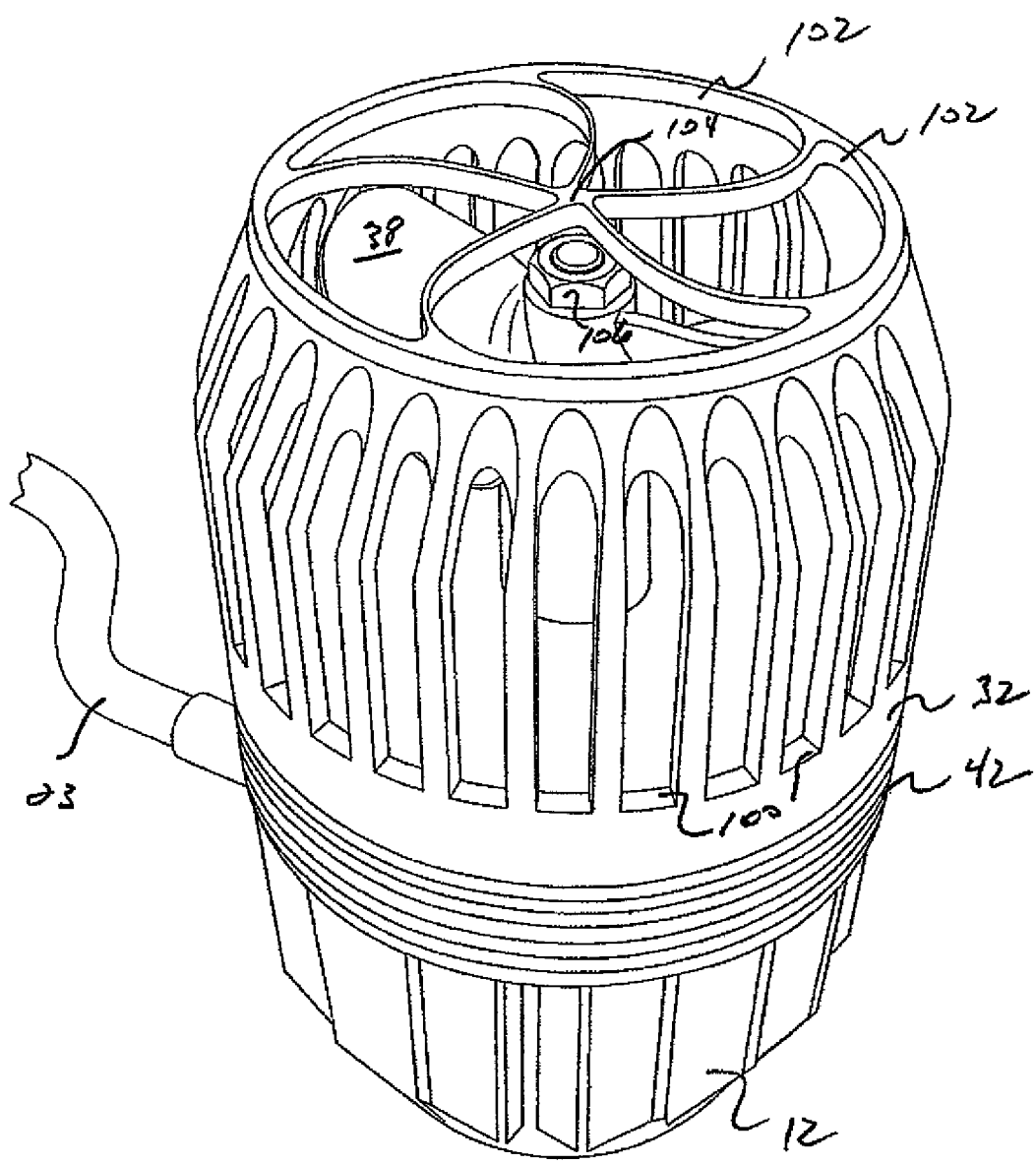
FIG. 7 is a perspective view of the fluid pump assembly.

As best shown in FIG. 7, a series of slots 100 extend longitudinally along casing 32 parallel to the axis of rotation 37 of propeller 38. A series of contoured openings 102 are formed in the end 104 of casing 32. Also illustrated in FIG. 7 is nut 106 that secures propeller 38 to shaft 40.

We have found that the net magnet attraction should be at least 1.0 pound, preferably at least 2.5 pounds and more preferably 4.5 pounds, in order to hold the casings in position and withstand the effect of gravity. The net magnetic attraction is the magnetic attraction attributable to the magnetic members 14, 34 and 55,57. Thus, the size of magnetic members and their magnetic strength may be reduced if the magnetic attraction between the clamping magnetic members 55,57 is increased. Reduced weight of magnetic members 14, 34 will allow a relatively small motor 18 to be utilized.

From the foregoing description it is clear that the current invention describes a novel fluid pump kit and a fluid pump assembly in combination with a container providing a magnetic drive coupling between a drive motor and an propeller of the pump assembly and detachably connected to a wall of the container solely by magnetic attraction force between first and second magnetic assemblies of the fluid pump assembly.

The present invention provides a number of advantages over the prior art, such as:

Magnetic assemblies clamp entire pump assembly to a container wall; a second casing of the pump within the container is self supporting.

Rotating magnetic driven member drives an propeller by which flow is outputted perpendicular to the vertical barrier without redirection.

A drive motor is external to the liquid, eliminating the addition of heat to the container, such as aquarium, through the pump.

Rotating magnetic members feature at least two poles oriented in a two-dimensional array, such as radially along a disc.

Rotating parts are held a small distance away from the wall between the two halves of the fluid pump assembly through the use of bearings.

Wear components, in the form of the bearings, are supported by and transfer axial force to the first and second casings of the fluid pump assembly.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method of mounting a fluid pump assembly to a container, the fluid pump assembly comprising first and second assemblies, the method comprising the steps of:
   providing the first assembly comprising a magnetic drive member, a drive motor operatively coupled to the magnetic drive member to impart rotary motion to the magnetic drive member, and a first casing configured to house the magnetic drive member and the drive motor;
   providing the second assembly comprising a rotatable magnetic driven member and a second casing configured to house the magnetic driven member;
   providing the container having a wall made of a non-magnetic material;
   positioning the first assembly with the drive motor on an exterior side of the wall of the container; and
   positioning the second assembly with the rotatable magnetic driven member on an interior side of the wall of the container so that the magnetic driven member of the second assembly being in coaxial alignment with the magnetic drive member of the first assembly and allowing the magnetic drive member and the magnetic driven member to remain in alignment solely as a result of a magnetic attraction force between the magnetic drive and driven members sufficient to support at least the driven device against gravity without the use of mechanical aids.

2. The method as defined in claim 1, wherein the drive motor is an electric motor.

3. The method as defined in claim 1, wherein the first assembly further comprises a cover attached to and covering a side of the magnetic drive member facing the drive motor, and wherein the cover shields the drive motor from magnetic flux generated by the rotary motion imparted to the magnetic drive member by the drive motor.

4. The method as defined in claim 3, wherein the cover is made of magnetically permeable material.

5. The method as defined in claim 3, wherein the cover is made of steel.

6. The method as defined in claim 1, wherein the second assembly further comprises a propeller operatively connected to the magnetic driven member so that the propeller rotates when the magnetic drive member imparts rotary motion to the magnetic driven member.

7. The method as defined in claim 6, wherein the magnetic drive member and the magnetic driven member are first and second circular disks, respectively, and wherein each of the first circular disk and the second circular disk has a plurality of pairs of magnetic poles (N) and (S).

8. The method as defined in claim 1, wherein each of the magnetic drive member and the driven member is a circular disk.

9. The method as defined in claim 8, wherein each of the magnetic drive member and the driven member includes a plurality of magnetic poles.

10. The method as defined in claim 9, wherein the magnetic poles are arrayed in a two-dimensional array.

11. A method of mounting a fluid pump assembly to a container, the method comprising the steps of:
   providing a drive device comprising a drive motor, a magnetic drive member coupled to the drive motor, a cover attached to and covering a side of the magnetic drive member facing the drive motor for shielding the drive motor from magnetic flux generated by the rotary motion imparted to the magnetic drive member by the drive motor, and a first casing configured to house the magnetic drive member, the cover and the drive motor;

providing a driven device comprising a magnetic driven member coupled to a rotatable member for imparting motion to a fluid, and a second casing configured to house the magnetic driven member and the rotatable member;

providing a container having a wall with opposite exterior and interior sides, the wall of the container made of a non-magnetic material;

mounting the drive device on the exterior side of the wall; and positioning the driven device on the interior side of the wall of the container so that the magnetic driven member being in coaxial alignment with the magnetic drive member and allowing the first and second casings to remain in alignment as a result of magnetic attraction between the magnetic drive and driven members, the magnetic attraction force being sufficient to support the second casing in a particular position against gravity without the use of mechanical aids.

12. The method as defined in claim 11, wherein the first casing houses the magnetic drive member with the drive motor and the cover therein, and wherein the second casing houses the magnetic driven member with the rotatable member therein.

13. The method as defined in claim 11, wherein the drive motor is an electric motor.

14. The method as defined in claim 11, wherein each of the magnetic drive member and the driven member is a circular disk.

15. The method as defined in claim 14, wherein each of the magnetic drive and driven members includes a plurality of magnetic poles.

16. The method as defined in claim 11, wherein the cover is made of magnetically permeable material.

17. The method as defined in claim 11, wherein the cover is made of steel.

* * * * *